US 7,779,269 B2

(12) United States Patent
Dobranski

(10) Patent No.: US 7,779,269 B2
(45) Date of Patent: Aug. 17, 2010

(54) TECHNIQUE FOR PREVENTING ILLEGAL INVOCATION OF SOFTWARE PROGRAMS

(75) Inventor: Lawrence Gerard Dobranski, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 1344 days.

(21) Appl. No.: 10/944,945

(22) Filed: Sep. 21, 2004

(65) Prior Publication Data

US 2006/0064593 A1 Mar. 23, 2006

(51) Int. Cl.
*G06F 21/00* (2006.01)
(52) U.S. Cl. ........................................ 713/187; 726/17
(58) Field of Classification Search ................ 713/167, 713/176, 179, 187; 726/2, 16, 28, 29, 30
See application file for complete search history.

(56) References Cited

U.S. PATENT DOCUMENTS

| | | | | |
|---|---|---|---|---|
| 5,757,914 A | * | 5/1998 | McManis | 713/187 |
| 6,105,137 A | * | 8/2000 | Graunke et al. | 726/24 |
| 6,961,852 B2 | * | 11/2005 | Craft | 713/168 |
| 7,073,062 B2 | * | 7/2006 | Leung et al. | 713/169 |
| 2002/0055942 A1 | * | 5/2002 | Reynolds | 707/200 |
| 2004/0103252 A1 | | 5/2004 | Lee et al. | |
| 2005/0188214 A1 | * | 8/2005 | Worley et al. | 713/187 |

* cited by examiner

*Primary Examiner*—Gilberto Barron, Jr.
*Assistant Examiner*—Virginia Ho
(74) *Attorney, Agent, or Firm*—Christopher & Weisberg, P.A.

(57) ABSTRACT

A technique for preventing illegal invocation of software programs is disclosed. In one particular exemplary embodiment, the technique may be realized as a method for preventing illegal invocation of software programs in a computer system having a first program that invokes a second program. The method may comprise generating a first digital signature for the first program. The method may also comprise making one or more permitted digital signatures available to the second program. The method may further comprise generating a first parameter for the first program, wherein the first parameter is cryptographically computed based on the first digital signature, a memory address for storing the first parameter, and a first system code that is unique to the computer system. The method may additionally comprise making the first parameter available to the second program.

18 Claims, 6 Drawing Sheets

Calling Program 402

```
Program_M( )
    Var
        Static Digital_Signature_Hash;
        Static System_Code;

Begin
        . . .
        . . .
        BuildComeFrom( );          ←—406
        Call Procedure_S(a, b);    ←—408
        . . .
        . . .
    End
```

Called Procedure 404

```
Procedure_S(x, y: int)
    Var
        Static System_Code;
        Static Structure Permitted_Hash_Values;
        Begin
412 {       Digital_Signature_Hash1
            Digital_Signature_Hash2
            . . .
            . . .
        End;

Begin
410—→  CheckComeFrom( );
        . . .
        . . .
    Return
```

Figure 4

Calling Program 402

```
Program_M()
  Var    Static Digital_Signature_Hash;
         Static System_Code;
  Begin
         :
         :
         BuildComeFrom();         ← 406
         Call Procedure_S(a, b);  ← 408
         :
         :
  End
```

Called Procedure 404

```
Procedure_S(x, y: int)
  Var    Static System_Code;
         Static Structure Permitted_Hash_Values;
       ⎧ Begin
       ⎪        :
   412 ⎨        Digital_Signature_Hash1
       ⎪        Digital_Signature_Hash2
       ⎪        :
       ⎩ End;

Begin
         CheckComeFrom();   ← 410
         :
         :
         Return
```

TECHNIQUE FOR PREVENTING ILLEGAL INVOCATION OF SOFTWARE PROGRAMS

FIELD OF THE DISCLOSURE

The present disclosure relates generally to computer security and, more particularly, to a technique for preventing illegal invocation of software programs.

BACKGROUND OF THE DISCLOSURE

With the fast development of computers and data networks, there have been an increasing number of hacker attacks, virus attacks on computer systems, and the introduction of malicious software. These attacks can cause failure of operating systems, loss of data files, disruption of network services, damage to computer hardware, and even loss of human lives. Many computer attacks involve illegal invocation of existing software programs in a targeted system. For example, an attacker can interject a malicious program to be executed by a host processor. The malicious program can then invoke otherwise benign programs in a pattern designed to initiate a buffer overflow for the host processor, thereby allowing the attacker to execute malicious program designed to give the attacker control over the targeted system.

Many existing computer systems are vulnerable to computer attacks employing illegal invocation of software programs. Yet, few existing solutions can effectively prevent this type of security breach. One prior art approach uses an operating system reference monitor to supervise intercommunications among program objects and to check program privileges and to control access to program assets. However, the reference monitor approach is usually very difficult to implement and is not readily adaptable to different system platforms. Some hardware solutions have also been proposed to protect memory buffers against overflow attacks. However, these solutions are usually applicable only to particular types of attacks. And hardware solutions are generally expensive and inflexible.

In view of the foregoing, it would be desirable to provide a countermeasure for illegal invocation of software programs which overcomes the above-described inadequacies and shortcomings.

SUMMARY OF THE DISCLOSURE

A technique for preventing illegal invocation of software programs is disclosed. In one particular exemplary embodiment, the technique may be realized as a method for preventing illegal invocation of software programs in a computer system having a first program that invokes a second program. The method may comprise generating a first digital signature for the first program. The method may also comprise making one or more permitted digital signatures available to the second program. The method may further comprise generating a first parameter for the first program, wherein the first parameter is cryptographically computed based on the first digital signature, a memory address for storing the first parameter, and a first system code that is unique to the computer system. The method may additionally comprise making the first parameter available to the second program.

In accordance with other aspects of this particular exemplary embodiment, the first digital signature may be generated based on a digital signature hash of a source code of the first program. The digital signature hash may be calculated based on a message-digest algorithm. Or the digital signature hash may be calculated based on a secure hash algorithm.

In accordance with further aspects of this particular exemplary embodiment, the method may further comprise inserting a first code in the first program, wherein the first code is adapted to generate the first parameter.

In accordance with additional aspects of this particular exemplary embodiment, the method may further comprise inserting a second code in the second program, wherein the second code is adapted to authenticate the first program.

In accordance with another aspect of this particular exemplary embodiment, the first parameter may be encrypted using a public key of the computer system.

In accordance with yet another aspect of this particular exemplary embodiment, the method may further comprise decrypting the first parameter using a private key of the computer system.

In accordance with another aspect of this particular exemplary embodiment, the method may further comprise authenticating the first program. The steps of authenticating may comprise retrieving a second parameter that corresponds to the first program, extracting a second digital signature and a second system code from the second parameter, and preventing the invocation of the second program by the first program unless the second digital signature is a permitted digital signature and the second system code matches the first system code.

In accordance with still further aspects of this particular exemplary embodiment, the first digital signature may be generated at compilation time of the first program. The first parameter may be generated at execution time of the first program.

In another particular exemplary embodiment, the technique may be realized by at least one signal embodied in at least one carrier wave for transmitting a computer program of instructions configured to be readable by at least one processor for instructing the at least one processor to execute a computer process for performing the method as recited above.

In yet another particular exemplary embodiment, the technique may be realized by at least one processor readable carrier for storing a computer program of instructions configured to be readable by at least one processor for instructing the at least one processor to execute a computer process for performing the method as recited above.

In still another particular exemplary embodiment, the technique may be realized as a method for preventing illegal invocation of software programs in a computer system having a first program that invokes a second program. The method may comprise retrieving a security parameter associated with the first program. The method may also comprise extracting a digital signature and a system code from the security parameter. The method may further comprise preventing the invocation of the second program by the first program unless the extracted digital signature matches a permitted digital signature and the extracted system code matches a permitted system code.

In accordance with other aspects of this particular exemplary embodiment, the digital signature may be generated based on a digital signature hash of a source code of the first program. The digital signature hash may be calculated based on a message-digest algorithm. Or the digital signature hash may be calculated based on a secure hash algorithm.

In accordance with further aspects of this particular exemplary embodiment, the security parameter may be encrypted using a public key of the computer system.

In accordance with additional aspects of this particular exemplary embodiment, the method may further comprise decrypting the security parameter using a private key of the computer system.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 4 shows two exemplary software programs in accordance with an embodiment of the present disclosure.

DETAILED DESCRIPTION OF EXEMPLARY EMBODIMENT(S)

Figure 1:
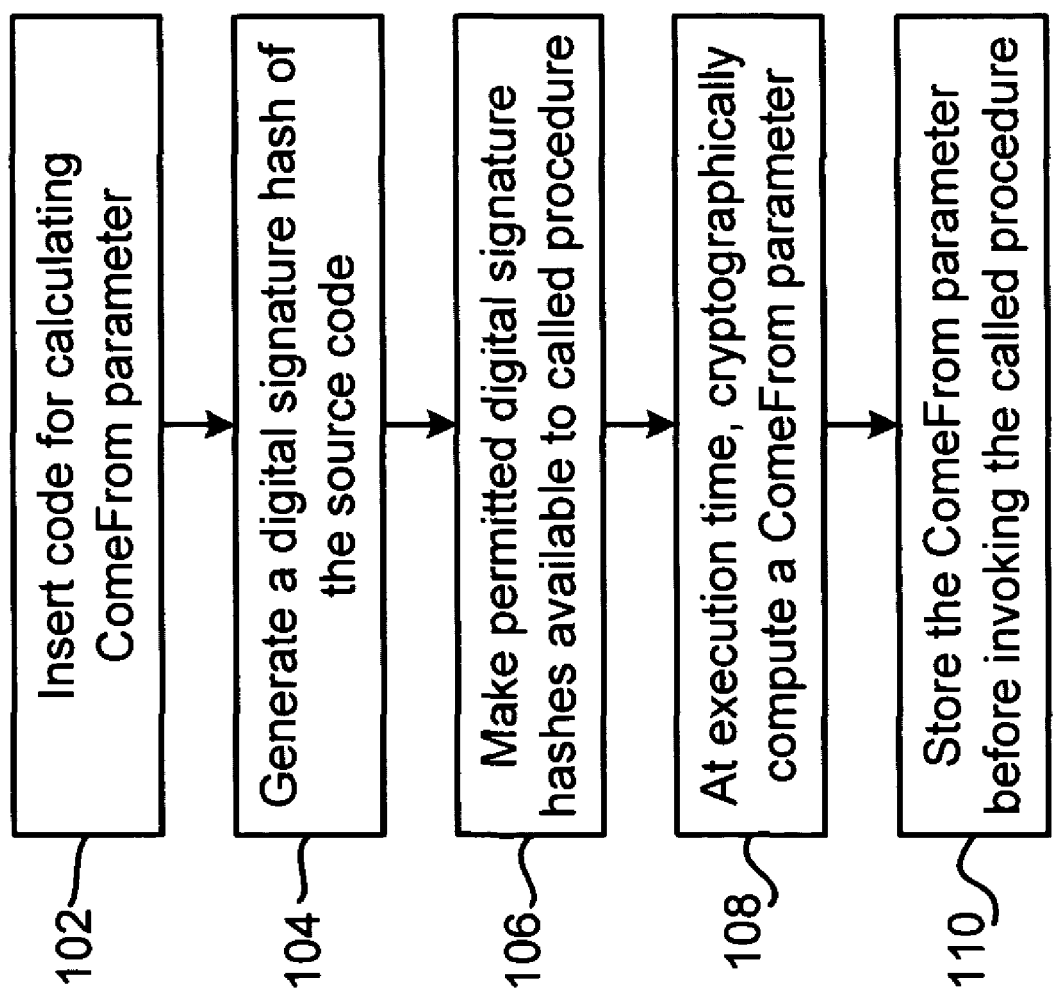
FIG. 1 and FIG. 2 are flow charts illustrating an exemplary process for preventing illegal invocation of software programs in accordance with an embodiment of the present disclosure.
Figure 2:
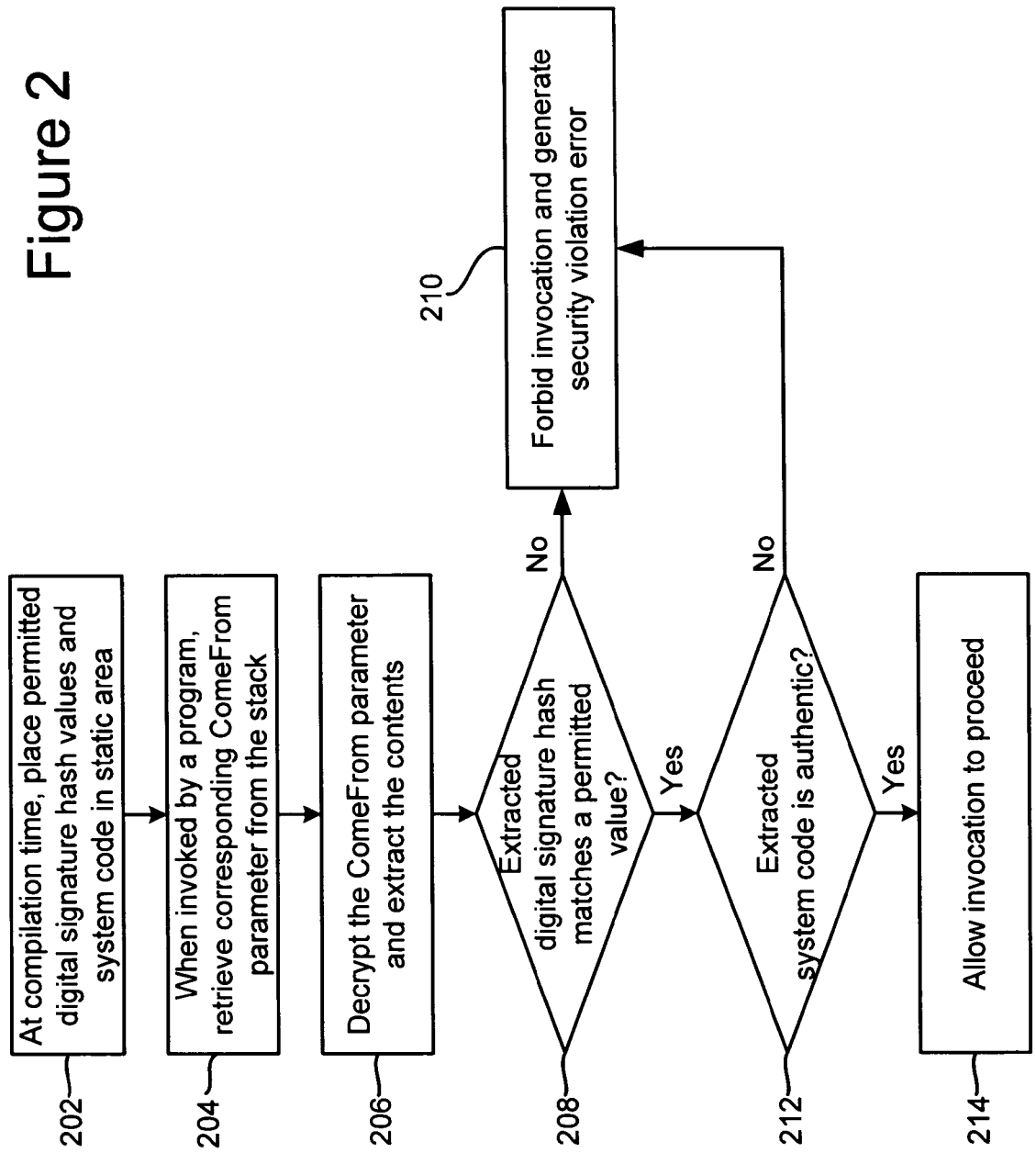

FIG. 1 and FIG. 2 are flow charts illustrating an exemplary method for preventing illegal invocation of software programs in accordance with an embodiment of the present disclosure. The exemplary method may be implemented in a computer system wherein one or more software programs are executed. Some of the software programs may call or invoke other software programs such as user functions, system routines and the like. For illustration purposes, a software program that invokes one or more other programs is referred to as a "calling program," and a software program being invoked by another program is referred to as a "called procedure." The exemplary method may comprise a process for setting up an authentication mechanism as shown in FIG. 1 and a process for authenticating calling programs as shown in FIG. 2.

Referring to FIG. 1, in step 102, a piece of code for calculating a ComeFrom parameter may be inserted into the source code of a calling program. A ComeFrom parameter is a security parameter for communicating certain authentication information between the calling program and a called procedure. Details of the ComeFrom parameter will be described below. One example is shown in the form of pseudo-codes in FIG. 4, wherein a Calling Program 402 includes code line 408 that invokes a Called procedure 404. In Calling Program 402, a code line 406 "BuildComeFrom( )" may be inserted prior to where the Called Program 404 is called. Insertion of the "BuildComeFrom( )" code may be done when the calling program is being compiled. Alternatively, the code for calculating the ComeFrom parameter may be manually inserted by a programmer.

In step 104, a digital signature for the calling program may be generated. The digital signature may be a value that is substantially unique to the calling program. According to one embodiment of the disclosure, the digital signature may be a digital signature hash of an ASCII representation of the source code or unlinked object code of the calling program. The digital signature hash may be calculated with a message-digest (MD-5) algorithm or a secure hash algorithm (SHA-1). Although a digital signature hash is described herein, other methods or algorithms may also be used to generate a value that is substantially unique to the calling program. If desired, the digital signature hash value may be encrypted for enhanced security.

If the calling program is a legitimate program permitted to invoke a called procedure, its digital signature hash may be included in a list of permitted digital signature hashes and made available to the called procedure in step 106. For example, the list may be kept in a static memory location which is also accessible by the called procedure.

Then, in step 108, a ComeFrom parameter may be cryptographically computed at execution time. Immediately before branching to the called procedure, the calling program may run the inserted code. The ComeFrom parameter may carry information that can uniquely identify the calling program to the called procedure. For example, the ComeFrom parameter may include a value that is unique to the calling program, such as the digital signature hash. The ComeFrom parameter may also include a value that is unique to the host computer system, such as a unique system code. The ComeFrom parameter may additionally include a memory address for storing the ComeFrom parameter. For example, the memory address may be a stack pointer value associated with a location of the ComeFrom parameter on the stack. The digital signature hash, the system code, and the memory address may be encrypted to generate a secure ComeFrom parameter using a public key of the host computer system. Decryption of the ComeFrom parameter may only be done using a matching private key.

Figure 3:
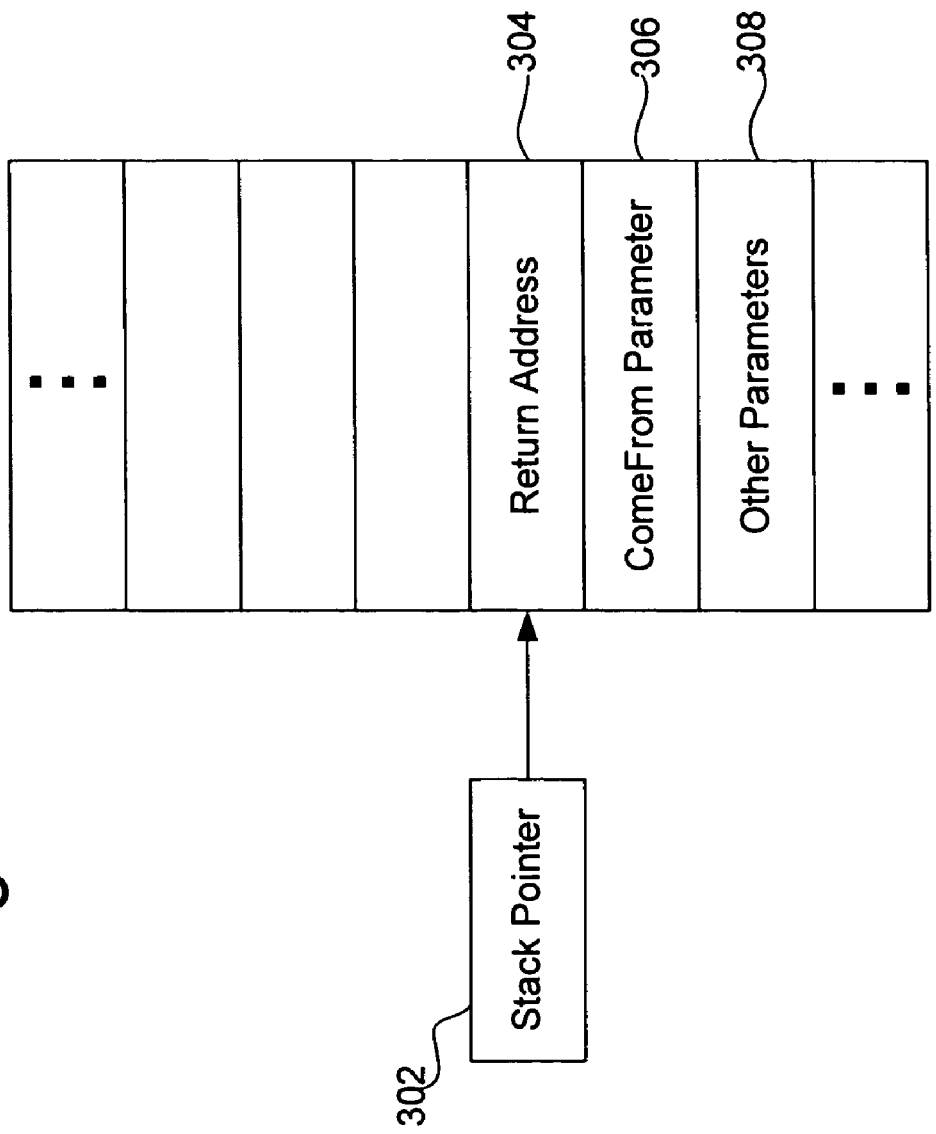
FIG. 3 illustrates an exemplary stack in accordance with an embodiment of the present disclosure.

In step 110, the ComeFrom parameter may be stored before an invocation of the called procedure. For example, the ComeFrom parameter may be pushed onto a program stack as shown in FIG. 3. In FIG. 3, a stack pointer 302 may indicate the memory location of a last item placed on the stack. That is, the stack pointer value is a memory address for the stack item pointed to by the stack pointer 302. For example, before calculation of the ComeFrom parameter, the stack pointer 302 may point to a memory location 308 that holds one or more other parameters. After the ComeFrom parameter is calculated and pushed onto the stack, the stack pointer 302 may point to the next memory location 306 on the stack. This stack pointer value or memory address may be encrypted into the ComeFrom parameter together with the digital signature hash and the system code. Then, the program branches to the called procedure, causing a return address to be pushed onto the stack at memory location 304. Note that the memory location 306 will be the place where the called procedure retrieves the ComeFrom parameter.

FIG. 2 is a flow chart illustrating an exemplary process for authenticating an invocation of the called procedure in accordance with an embodiment of the present disclosure.

In step 202, when the called procedure is compiled, a list of permitted digital signature hashes and the system code may be placed in a static memory area accessible by the called procedure. For example, this step may be achieved by the code lines 412 of the called procedure 404 shown in FIG. 4, in which the static parameter "System_Code" corresponds to the system code and the static structure "Permitted_Hash_Values" lists the permitted digital signature hashes.

When invoked by another software program (i.e., a calling program), the called procedure may authenticate the calling program. That is, the called procedure may determine whether the calling program is a legitimate program that is fully authorized to make the invocation. The authentication process may be done by inserting a piece of code at the beginning of the called procedure. For example, referring to in FIG. 4, a code line 410, "CheckComeFrom( )," may be inserted at the beginning of the called procedure 404 to carry out the authentication procedure as described in the following steps.

In step 204, a ComeFrom parameter corresponding to the calling program may be retrieved from the stack, for example. If a ComeFrom parameter of recognized format is not found on the stack or in a specific memory location, the calling program may not be an authorized calling program. If a proper ComeFrom parameter is retrieved, then, in step 206, the ComeFrom parameter may be decrypted using a private key that corresponds to the public key employed earlier for encryption. From the decrypted ComeFrom parameter, three items may be retrieved: a memory address from where the ComeFrom parameter was retrieved, a digital signature hash, and a system code.

In step 208, it may be determined whether the extracted digital signature hash matches a permitted value. If the extracted hash value is not found among the list of permitted digital signature hashes, the calling program is not an authorized calling program. The invocation by the calling program may be forbidden in step 210 and a security violation error may be generated. If the extracted hash value matches a permitted digital signature hash, it may be determined in step 212 whether the extracted system code is authentic. The extract system code may be compared with the true system code stored in the static memory area. If these two codes do not match, the calling program is not authorized and a security violation error may be generated in step 210. If there is a match, then, in step 214, the invocation of the called procedure by the calling program may be allowed to proceed.

Figure 5:
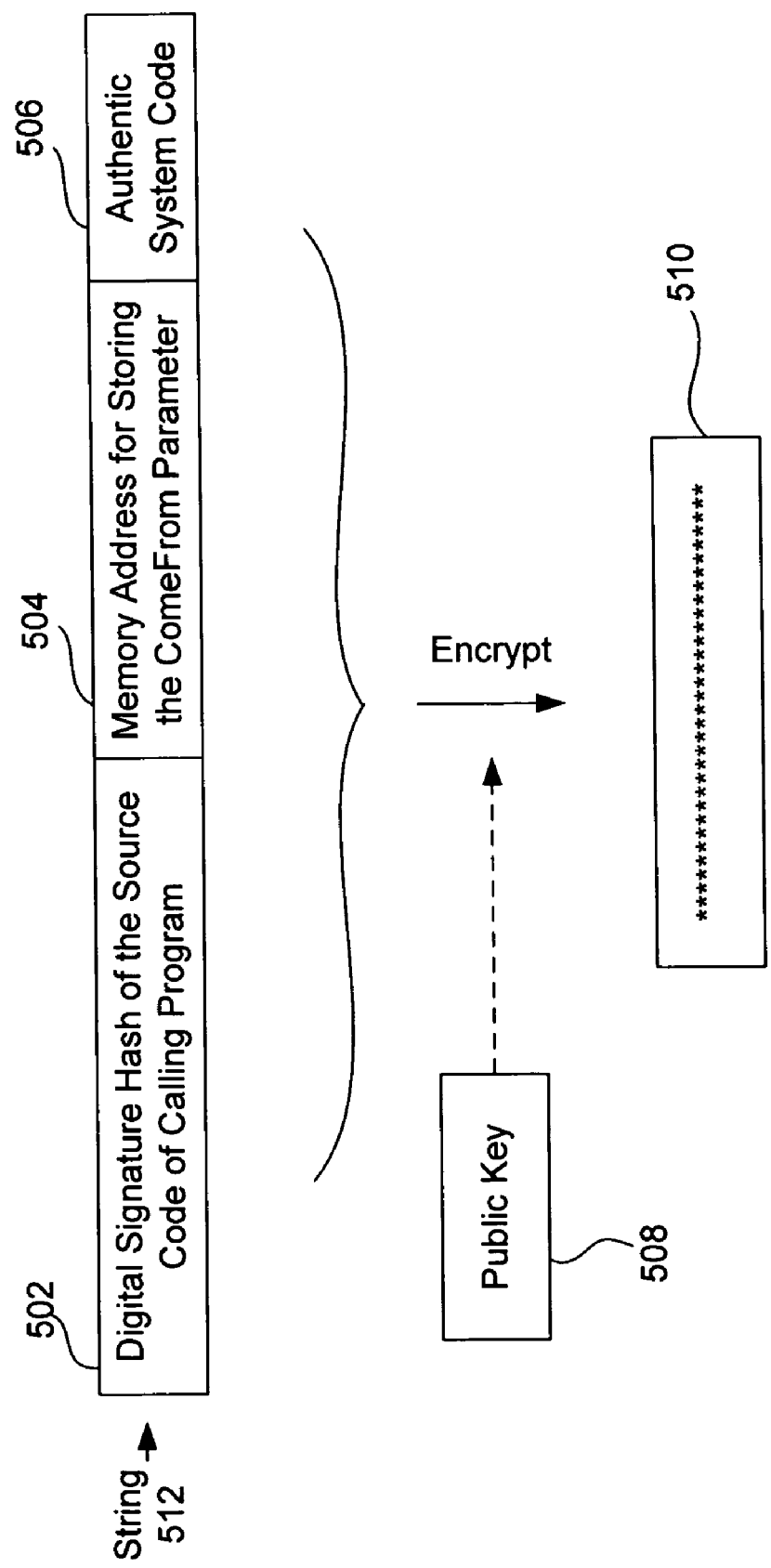
FIG. 5 illustrates the generation of an exemplary ComeFrom parameter in accordance with an embodiment of the present disclosure.

Referring to FIG. 5, there is shown the generation of an exemplary ComeFrom parameter in accordance with an embodiment of the present disclosure. As described above, the ComeFrom parameter may be based on three values: a digital signature hash value 502 of the source code of the calling program, a memory address 504 for storing the ComeFrom parameter, and a system code 506. When calculating the ComeFrom parameter, these three values may be first combined into a string 512. Then, based on a cryptographic algorithm, the string 512 may be encrypted into a ComeFrom parameter 510 using a public key 508. This public key 508 may be an encryption key known to all computers or operating systems in the host computer system.

Figure 6:
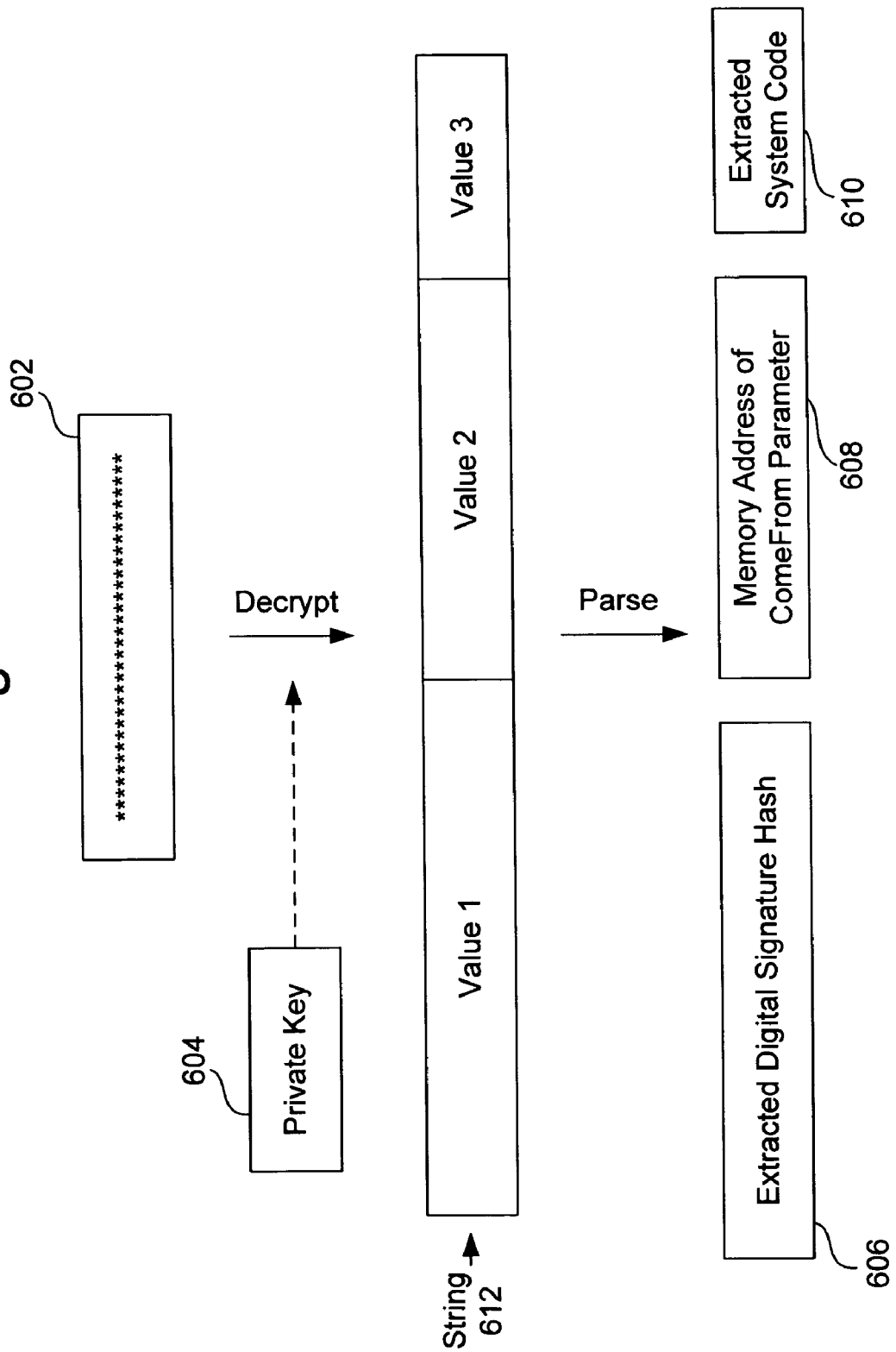
FIG. 6 illustrates the decryption of an exemplary ComeFrom parameter in accordance with an embodiment of the present disclosure.

FIG. 6 illustrates the decryption of an exemplary ComeFrom parameter in accordance with an embodiment of the present disclosure. In FIG. 6, a ComeFrom parameter 602 may be decrypted into a string 612 using a private key 604. The private key 604 may be a decryption key having a particular relationship to the public key 508 shown in FIG. 5, such that a message encrypted with the public key 508 can only be properly decrypted with the private key 604. The decrypted string 612 may comprise three components: Value 1, Value 2, and Value 3. Next, the decrypted string 612 may be parsed according to a pre-specified ComeFrom parameter format, such that a digital signature hash 606, a memory address 608, and a system code 610 may be extracted. These extracted values may then be used to authenticate a calling program that corresponds to the ComeFrom parameter 602.

At this point it should be noted that the technique for preventing illegal invocation of software programs in accordance with the present disclosure as described above typically involves the processing of input data and the generation of output data to some extent. This input data processing and output data generation may be implemented in hardware or software. For example, specific electronic components may be employed in a computer system or computer network or similar or related circuitry for implementing the functions associated with the prevention of illegal invocation of software programs in accordance with the present disclosure as described above. Alternatively, one or more processors operating in accordance with stored instructions may implement the functions associated with the prevention of illegal invocation of software programs in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the following appended claims. Further, although the present disclosure has been described herein in the context of a particular implementation in a particular environment for a particular purpose, those of ordinary skill in the art will recognize that its usefulness is not limited thereto and that the present disclosure can be beneficially implemented in any number of environments for any number of purposes. Accordingly, the claims set forth below should be construed in view of the full breadth and spirit of the present disclosure as described herein.

The invention claimed is:

1. A method for preventing illegal invocation of software programs in a computer system having a first program that invokes a second program, the method comprising:
   generating a first digital signature for the first program, wherein the first digital signature is generated based at least in part on a representation of the first program, wherein the first digital signature is generated using an algorithm, wherein the first digital signature is generated based at least in part on an ASCII representation of source code of the first program;
   making one or more permitted digital signatures available to the second program;
   generating a first parameter for the first program, wherein the first parameter is cryptographically computed based on the first digital signature, a memory address for storing the first parameter, and a first system code that is unique to the computer system; and
   making the first parameter available to the second program.

2. The method according to claim 1, wherein the first digital signature is generated based on a digital signature hash of a source code of the first program.

3. The method according to claim 2, wherein the algorithm is a message-digest algorithm.

4. The method according to claim 2, wherein the algorithm is a secure hash algorithm.

5. The method according to claim 1 further comprising:
inserting a first code in the first program, wherein the first code is adapted to generate the first parameter.

6. The method according to claim 1 further comprising:
inserting a second code in the second program, wherein the second code is adapted to authenticate the first program.

7. The method according to claim 1, wherein the first parameter is encrypted using a public key of the computer system.

8. The method according to claim 7 further comprising:
decrypting the first parameter using a private key of the computer system.

9. The method according to claim 1 further comprising:
authenticating the first program.

10. The method according to claim 9, wherein the step of authenticating comprises:
retrieving a second parameter that corresponds to the first program;
extracting a second digital signature and a second system code from the second parameter; and
preventing the invocation of the second program by the first program unless the second digital signature is a permitted digital signature and the second system code matches the first system code.

11. The method according to claim 1, wherein the first digital signature is generated at compilation time of the first program.

12. The method according to claim 1, wherein the first parameter is generated at execution time of the first program.

13. At least one non-transitory processor readable carrier for storing a computer program of instructions configured to be readable by at least one processor for instructing the at least one processor to execute a computer process for performing the method as recited in claim 1.

14. A method for preventing illegal invocation of software programs in a computer system having a first program that invokes a second program, the method comprising:
retrieving a security parameter associated with the first program;
extracting a digital signature and a system code from the security parameter, wherein the digital signature is generated based at least in part on an ASCII representation of source code of the first program, wherein the digital signature is generated using a secure hash algorithm; and
preventing the invocation of the second program by the first program unless the extracted digital signature matches a permitted digital signature and the extracted system code matches a permitted system code.

15. The method according to claim 14, wherein the digital signature is further generated based on a digital signature hash of a source code of the first program.

16. The method according to claim 14, wherein the security parameter is encrypted using a public key of the computer system.

17. The method according to claim 16 further comprising:
decrypting the security parameter using a private key of the computer system.

18. A method for preventing illegal invocation of software programs in a computer system having a first program that invokes a second program, the method comprising:
generating a first digital signature for the first program, wherein the first digital signature is generated based at least in part on an ASCII representation of source code of the first program, wherein the first digital signature is generated using a secure hash algorithm;
making one or more permitted digital signatures available to the second program;
generating a first parameter for the first program during execution of the first program, wherein the first parameter is cryptographically computed based on the first digital signature, a memory address for storing the first parameter, and a first system code that is unique to the computer system, the first parameter forming information uniquely associated with the first program; and
making the first parameter available to the second program.

* * * * *